United States Patent
Griswold

(10) Patent No.: US 7,264,225 B1
(45) Date of Patent: Sep. 4, 2007

(54) SPRING SPREADER AND METHOD OF FABRICATION AND ASSEMBLY

(75) Inventor: James L. Griswold, 2692 Birchview, Kewadin, MI (US) 48648

(73) Assignee: James L. Griswold, Kewadin, MI (US)

( * ) Notice: Subject to any disclaimer, the term of this patent is extended or adjusted under 35 U.S.C. 154(b) by 0 days.

(21) Appl. No.: 11/471,829

(22) Filed: Jun. 21, 2006

(51) Int. Cl.
  *B23P 19/04* (2006.01)
(52) U.S. Cl. ........................................ 254/10.5; 29/227
(58) Field of Classification Search .............. 254/10.5; 29/227, 211–218, 251, 252
  See application file for complete search history.

(56) References Cited

U.S. PATENT DOCUMENTS

| | | | |
|---|---|---|---|
| 1,668,584 A | 5/1928 | Corey | |
| 1,670,220 A | 5/1928 | Thweatt | |
| 1,755,088 A | 4/1930 | Vickrey | |
| 1,784,033 A | 12/1930 | Swanby | |
| 1,803,750 A | 5/1931 | Droddy | |
| 1,808,625 A | 6/1931 | Barnhart | |
| 1,862,172 A | 6/1932 | Bennett | |
| 1,872,579 A | 8/1932 | Hansen | |
| 1,881,050 A | 10/1932 | Grant | |
| 1,898,121 A | 2/1933 | Gayne | |
| 2,594,443 A | 4/1952 | Johnston | |
| 2,665,109 A | 1/1954 | Romby | |
| 5,087,019 A | 2/1992 | Peabody et al. | |
| 5,172,889 A * | 12/1992 | Post et al. | 254/10.5 |
| 6,978,982 B1 * | 12/2005 | Jin | 254/10.5 |

* cited by examiner

*Primary Examiner*—Lee D. Wilson
(74) *Attorney, Agent, or Firm*—Dickinson-Wright, PLLC

(57) ABSTRACT

A leaf spring spreader assembly comprising a tubular frame (20) having a V-shape with legs (22) extending in opposite directions from an apex (24) to a collar (30) welded to each of spaced ends with a screw (32) disposed in telescoping relationship with and extending axially out of each leg (22) to a plate (42) for engaging the end curl (34) of a leaf spring. A nut (36) has radial holes (38) for receiving a round rod to rotate the nut (36) for reacting with the collar (30) for moving the screw (32) relative to the frame. A bearing (40) is disposed about each screw (32) for transmitting thrust loads from and facilitating rotation of the nut (36). A tension spring (52) is pulled through the tubular frame (20) and connected to the second screw (32) and released to pull the inner ends of the screws (32) together to retain the nuts (36) in engagement with the bearings (40) to maintain the components together.

20 Claims, 3 Drawing Sheets

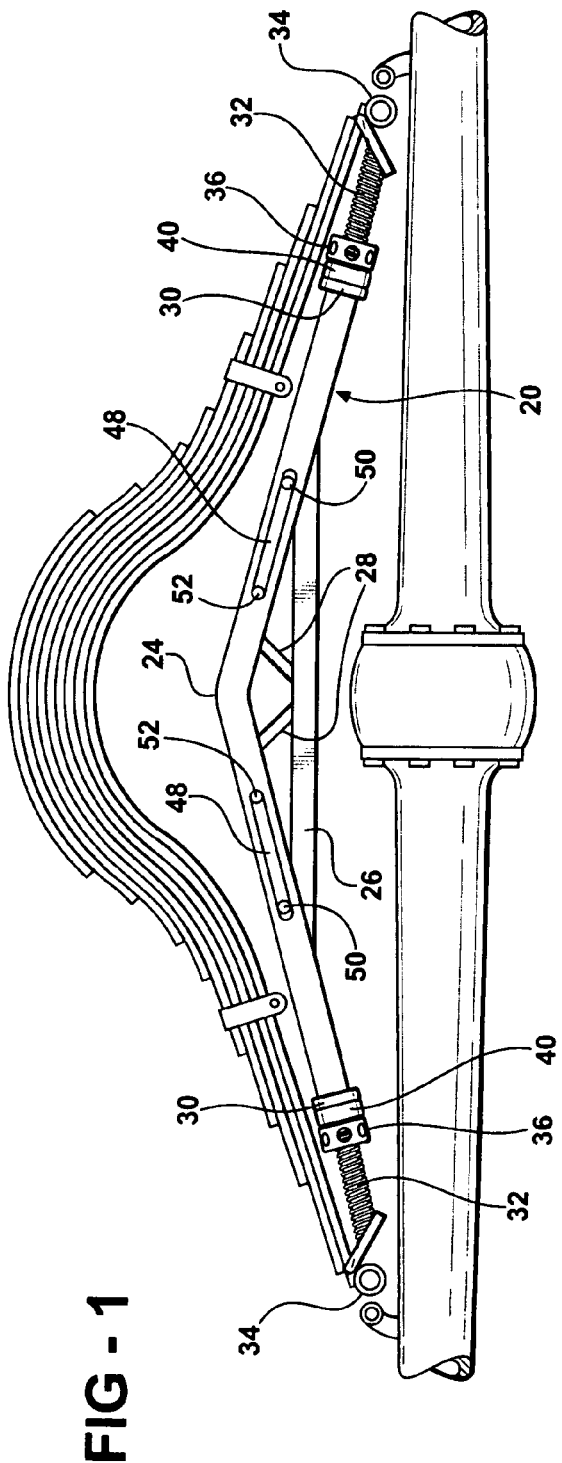
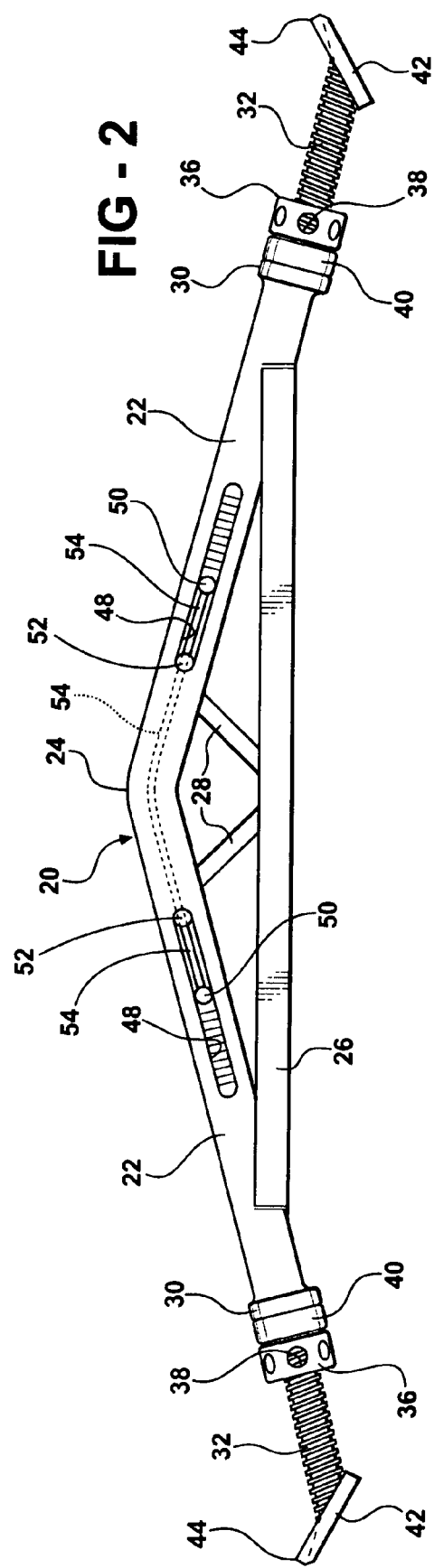

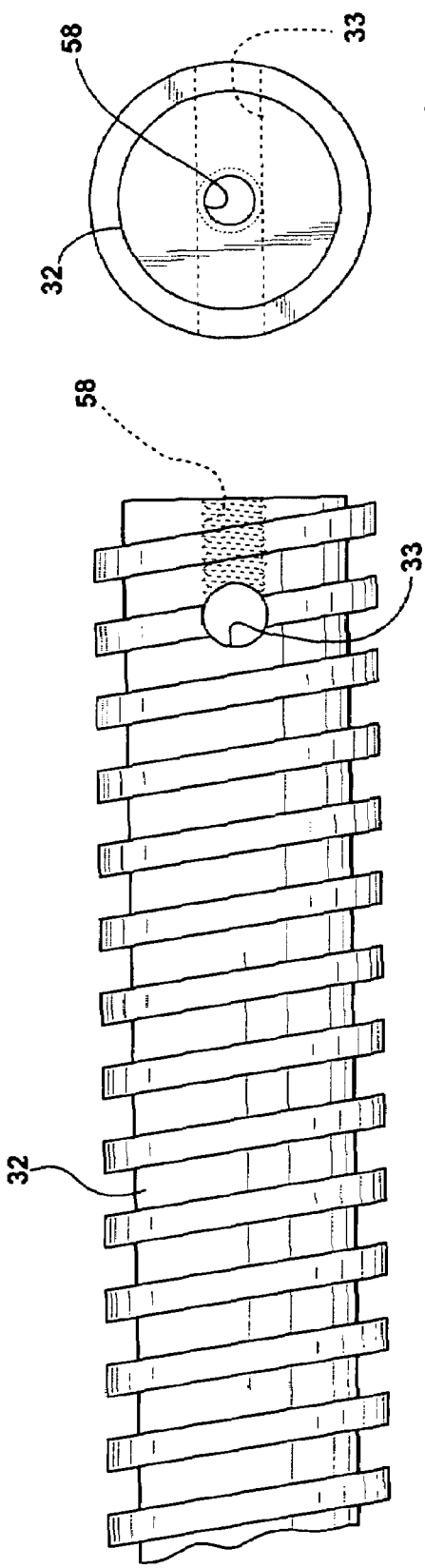
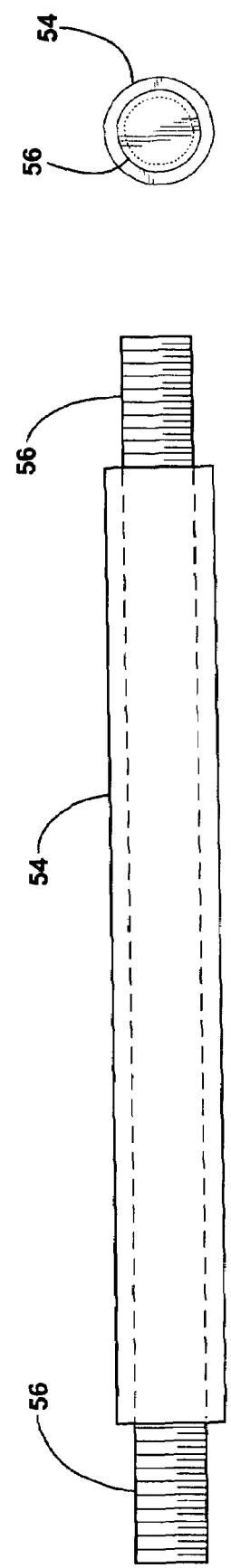

SPRING SPREADER AND METHOD OF FABRICATION AND ASSEMBLY

BACKGROUND OF THE INVENTION

1. Field of the Invention

A leaf spring spreader assembly useful for spreading a leaf spring of the type extending across the rear axle of an automobile and connected to a shackle at each end.

2. Description of the Prior Art

The spring spreaders of the type to which the subject invention pertains, spread the rear leaf spring of the bowed suspension type extended longitudinally of the rear axle housing for removal from and attachment to the shackles. One such spreader is illustrated in U.S. Pat. No. 1,755,088 to Vickrey wherein a frame includes legs extending in opposite directions to spaced tubular ends with threaded screws having inner ends disposed in telescoping relationship with the tubular ends of the frame legs and extending axially in opposite directions out of the tubular ends of the legs for engaging the end curls of a leaf spring. A nut threadedly engages each of the screws and reacts with the tubular ends of the frame for moving the associated screw into and out of the leg associated therewith in response to rotation of the nut. This patent and the U.S. Pat. No. 1,784,033 to Swanby and U.S. Pat. No. 1,808,625 to Barnhart disclose an upwardly offset central section between the tubular ends of the frame for accommodating the differential housing. In addition, the Barnhart patent shows the additional feature of a bearing between the nut and the frame and ears for engaging the sides of the leaf spring. Swanby shows a pin and slot arrangement to prevent rotation of the screws relative to the frame.

However, the prior art spreaders usually utilize components especially manufactured for use only in a specific spreader assembly. Since such spreader assemblies are manufactured and sold in very small quantities, such especially made components can cause the price to be unacceptable. In addition, some of the prior art assemblies include loose components that are often difficult to orient and retain together while manipulating the assembly into position for spreading a leaf spring. Often the screws have machine threads requiring an exhaustive number of turns for each increment of axial screw movement as well as special or dedicated wrenches to rotate the nuts. Such wrenches are often very awkward to use to rotate the nut due to the limited space under the spring and above the axle housing.

SUMMARY OF THE INVENTION AND ADVANTAGES

The invention provides such a spring spreader assembly including a tension spring interconnecting the inner ends of the screws to retain the nuts in engagement with the spaced ends of the legs and to allow the screws to be pulled axially along into and out of the legs.

The invention also provides a method of fabricating such a leaf spring spreader assembly characterized by the steps of attaching a first screw to a first end of a tension spring and a second screw to a second end of a tension spring, connecting the first end of the tension spring to the inner end of a first of the screws, attaching a first end of a string to the second end of the tension spring, attaching a weight to the second end of the string, dropping the weight through the tubular frame, inserting the first screw into a first leg of the tubular frame to retain the nut thereon in engagement with the end of the first leg, pulling the string and the second end of the tension spring out of the second leg, gripping the second end of the tension spring to hold the second end of the tension spring out of the second leg, removing the string from the second end of the tension spring, attaching the second end of the tension spring to the second screw, and inserting the second screw into the second leg of the tubular frame to retain the nut thereon in engagement with the second leg whereby the screws may be pulled axially along into and out of the legs against the biasing of the tension spring.

Therefore, the subject invention is efficiently fabricated by welding and assembly of readily available or commodity components such as pipe, screws, bearings, tension springs, and the like. After fabricating a tubular frame having legs extending in opposite directions to spaced ends, the screws are inserted into telescoping relationship with the legs with the nuts on the screws for reacting with the respective ends of the legs. During this novel fabrication and assembly, a tension spring interconnects the inner ends of the screws and is released to retain the nuts in engagement with the ends of the legs.

Accordingly, the subject invention provides a leaf spring spreader fabricated from off-the-shelf or commodity components that are easily assembled and operated to spread a leaf spring.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a front elevation view showing the spring spreader assembly of the subject invention in position on a leaf spring of an automotive vehicle;

FIG. 2 is a front elevation view showing the spring spreader assembly of the subject invention;

FIG. 6 is a fragmentary side view of the inner end of the screw utilized in the subject invention;

FIG. 7 is an end view of FIG. 6;

FIG. 8 is a side view of the tension spring with integral male threaded connectors on each end; and FIG. 9 is an end view of FIG. 8.

DETAILED DESCRIPTION OF THE INVENTION

Figure 3:
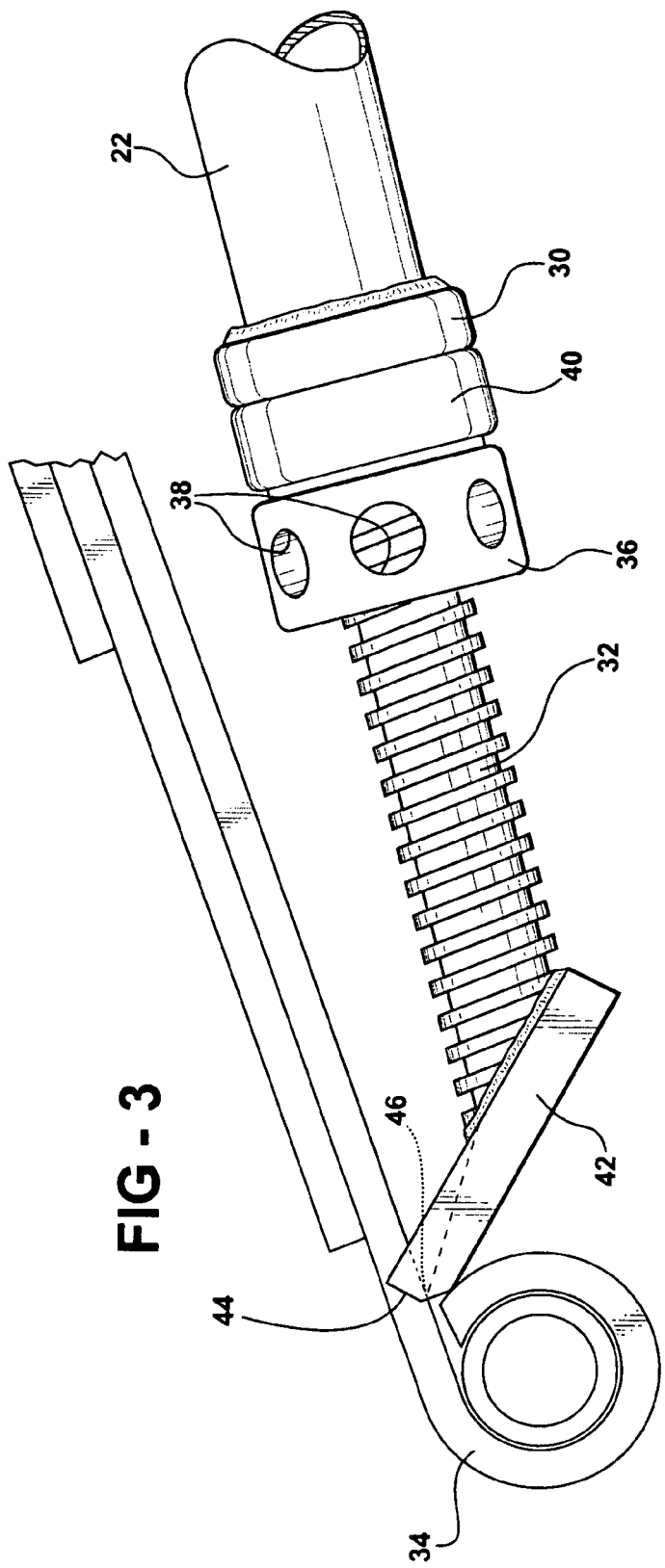
FIG. 3 is an enlarged fragmentary view of one end of the spring spreader engaging the sides and end curl of a leaf spring.
Figure 5:
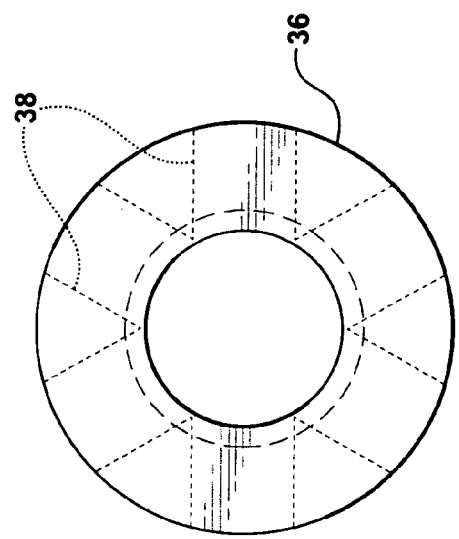
FIG. 5 is a side view of a nut.
Figure 4:
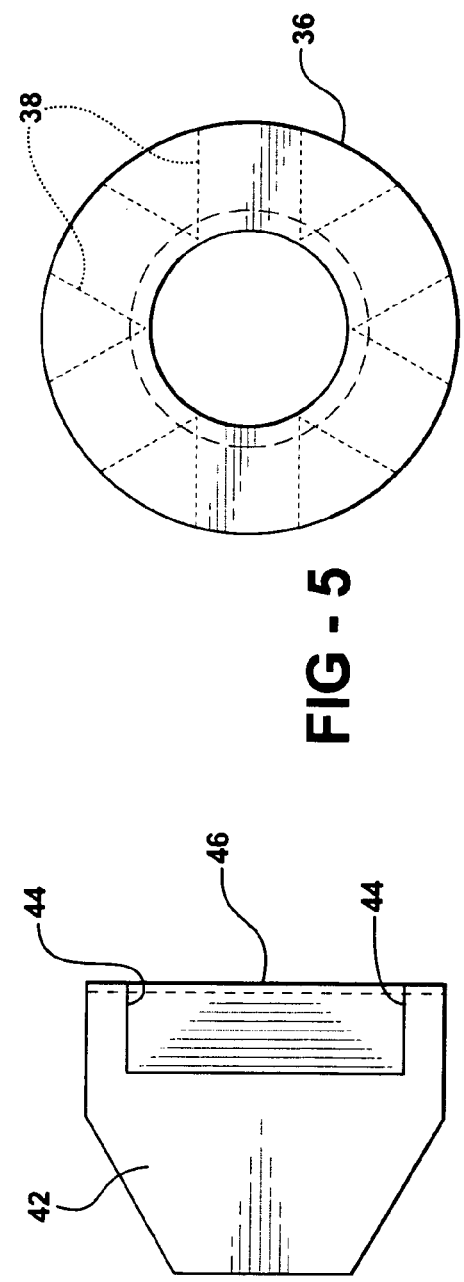
FIG. 4 is a top view of a plate defining a claw end of the screws.

Referring to the Figures, wherein like numerals indicate corresponding parts throughout the several views, a leaf spring spreader assembly constructed in accordance with the subject invention is shown in FIGS. 1 and 2.

The spring spreader assembly is fabricated from a pipe bent into a tubular frame 20 generally indicated and having a V-shape with legs 22 extending in opposite directions from an apex 24 to spaced ends. A cross beam 26 extends across the V-shape and interconnects the legs 22 for stabilizing the legs 22, the cross beam 26 having a right angled cross section with each end thereof cradling one of the legs 22 of the frame. In other words, the cross beam 26 is an angle iron welded to the underside of the tubular legs 22 of the frame.

In addition, truss members 28 diverge from one another under the apex 24 and interconnect the cross beam 26 and the legs 22, the truss members 28 being almost perpendicular to the respective legs 22.

A collar 30 is welded to each of the spaced ends of the legs 22. A screw 32 having acme threads about a longitudinal axis has an inner end disposed in telescoping relationship with and extends axially out of the spaced end of each of the legs 22 to a claw end for engaging the end curl 34 of a leaf spring. A nut 36 threadedly engages each of the screws 32 and reacts with the collar 30 at each spaced end of each of the legs 22 for moving the associated screw 32 into and out of the leg 22 associated therewith in response to rotation of the nut 36. Each of the nuts 36 has a plurality of circumferentially spaced cylindrical holes 38 extending radially for receiving a shaft-tool for rotating the nuts 36. The shaft-tool may comprise a simple round rod for insertion into successive holes 38 for rotating the nuts 36. The acme threads threadedly interconnecting the screws 32 and the nuts 36 provide easier rotation of the nuts 36 as compared to machine threads and fewer turns are required for the same linear movement of the screws 32 relative to the frame.

For transmitting thrust loads and reducing friction, a bearing 40 is disposed about each screw 32 to engage each of the collars 30 for transmitting thrust loads from, and facilitating rotation of the nut 36 associated therewith. The diameter of the screw 32 is slightly less, i.e., a slip fit, than the internal diameter of the tubular legs 22.

A plate 42 is secured by welding to the claw end of each screw 32 and is disposed at an angle of forty degrees relative to the axis of the screw 32 associated therewith and extends above the screw 32. Each of the plates 42 has a chisel edge 46 between in the upper-outer corners 44 to define a guide for engaging the side edges and the end curl 34 of the leaf spring.

The legs 22 each have a slot 48 through the near wall extending axially along the screw 32 associated therewith and a pin 50 extends radially from each of the screws 32 and into the slot 48 of the leg 22 associated therewith for sliding movement along the slots 48 as the screws 32 move axially relative to the legs 22. The slot 48 and pin 50 mechanism maintains the plates 42 at the claw ends oriented relative to the frame and to maintain the frame upright above the differential while being placed in position and thereafter rotating the nuts 36. A hole 38 is provided through the far wall of each leg 22 at one end of the slot 48 for access to drive the pin 50 out of screw 32 for disassembly.

A threaded hole 38 is provided in each of the inner ends of the screws 32 and threadedly engages each end of a tension spring 52 which insures that the nuts 36 and bearings 40 are always up against the spaced ends of the legs 22 and allow the screws 32 to be pulled axially along and out of the legs 22. One of the screws 32 may be fully inserted and the tension spring 52 extended out the opposite tubular end sufficiently to attach to the other threaded hole 38 whereby both screws 32 are pulled into the tubular frame 20. The tension spring 52 has sufficient elasticity to be pulled out of one end of one of the legs 22 for attachment to the threaded hole 38 on the other screw 32 and yet retract both screws 32 into the respective legs 22. In the preferred embodiment, the tension spring 52 comprises a bungee chord, or the like, but any suitable device may be employed.

As alluded to above, the subject invention also includes a method of fabricating a leaf spring spreader assembly comprising the steps of bending a pipe into a tubular frame 20 having a V-shape with legs 22 extending in opposite directions from an apex 24 to spaced ends, welding a cross beam 26 extending across the V-shape and interconnecting the legs 22 for stabilizing the legs 22, and welding truss members 28 to the cross beam 26 and the legs 22 to diverge from one another. The fabrication continues by welding a collar 30 to each of the spaced ends of the legs 22, and forming a slot 48 through the near wall extending axially along each of the legs 22.

A plate 42 is welded to a claw end of each of the screws 32 at an angle of forty degrees relative to the axis of the screw 32 associated therewith so as to extend above the screw 32 to form a chisel edge 46 between upper-outer corners 44.

The assembly includes threadedly engaging a nut 36 on each of two screws 32 disposing a bearing 40 about each screw 32 for engaging each of the collars 30.

A male threaded end is formed to each of opposite ends of a tension spring 52 and a first of the threaded ends is connected by threads to the inner end of a first of the screws 32. Surgical tubing of pure latex has found to be an excellent tension spring 52. An adapter is attached to a first end of a string and is threadedly attached to the second end of the spring. The assembly continues by attaching a weight to the second end of the string and dropping the weight through the tubular frame 20, starting at the open end of the first leg 22. The pulling of the second end of the tension spring 52 out of the second leg 22, requires the inserting of the first screw 32 into a first leg 22 of the tubular frame 20 to retain the nut 36 and bearing 40 thereon in engagement with the collar 30 at the end of the first leg 22.

By gripping the second end of the tension spring 52 with a tool to hold the second end of the tension spring 52 out of the second leg 22, the adapter and spring are removed from the second end of the tension spring 52. The second end of the spring is then threadedly connected to the inner end of the second screw 32. A tension spring 54 is pulled through the tubular frame 20 and connected to the second screw 32 and released to pull the inner ends of the screws 32 together to retain the nuts 36 in engagement with the bearings 40 to maintain the components together. The final step includes securing a pin 50 to each of the screws 32 to extend radially from and into the slot 48 of the surrounding leg 22 for sliding movement along the slot 48 as the screws 32 move axially relative to the legs 22.

Accordingly, the invention provides a method of fabricating a leaf spring spreader assembly of the type including a tubular frame 20 having legs 22 extending in opposite directions to spaced ends, a screw 32 having threads about a longitudinal axis and having an inner end disposed in telescoping relationship with and extending axially out of the spaced end of each of the legs 22 to a claw end for engaging the end curl 34 of a leaf spring, and a nut 36 threadedly engaging each of the screws 32 and reacting with the spaced end of each of the legs 22 for moving the associated screw 32 into and out of the leg 22 associated therewith in response to rotation of the nut 36. The method includes the steps of connecting the first end of a tension spring 52 to a first screw 32, attaching the first end of a string to the second end of the tension spring 52, attaching a weight to the second end of the string, and dropping the weight through the first end of the tubular frame 20 through and beyond the second end of the tubular frame 20.

This naturally leads to inserting the first screw 32 into the first end of the tubular frame 20, pulling and holding the string and second end of the male threaded end and second end of the tension spring 52 beyond the second end of the tubular frame 20, gripping the second end of the tension spring 52 to hold it beyond the second end of the tubular frame 20, and removing the string from the second end of the tension spring 52.

The fabrication continues by connecting the second end of the tension spring 52 to the second screw 32, releasing the gripping and holding of the tension spring 52 out beyond the second end of the tubular frame 20, and allowing the second screw 32 to insert into the second end of the tubular frame 20 with the inner ends of both screws 32 biased toward the apex 24 of the tubular frame 20 by the tension spring 52.

More specifically, the method proceeds by engaging a nut 36 to a first screw 32 and screwing the nut 36 to the claw end of the first screw 32, disposing a collar 30 on each of the spaced ends of the legs 22, sliding a bearing 40 over the screw 32 and into contact with the nut 36, threadedly connecting the first end of a tension spring 52 to the threaded hole 38 of a first screw 32, inserting the first screw 32 into the first end of the tubular frame 20 with the bearing 40 in contact with the first end of the tubular frame 20 and the associated collar 30, engaging a nut 36 to a second screw 32 and screwing the nut 36 to the claw end of the second screw 32, sliding a bearing 40 over the second screw 32 and into contact with the nut 36, and threadedly connecting the second end of the tension spring 52 to the threaded hole 38 of the second screw 32.

For alignment purposes, the method may include rotating each screw 32 to an orientation within the tubular frame 20 to align a cross hole 38 in each screw 32 with a slot 48 in each leg 22, and inserting a pin 50 through each slot 48 into aligned cross hole 38 of each screw 32 with the pin 50 extending outside the slot 48 in the associated leg 22 of the tubular frame 20.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
| --- | --- |
| 20 | tubular frame |
| 22 | legs |
| 24 | apex |
| 26 | cross beam |
| 28 | truss members |
| 30 | collar |
| 32 | screw |
| 34 | curl |
| 36 | nut |
| 38 | holes |
| 40 | bearing |
| 42 | plate |

-continued
ELEMENT LIST

| Element Symbol | Element Name |
| --- | --- |
| 44 | corner |
| 46 | chisel edge |
| 48 | slots |
| 50 | pin |
| 52 | tension spring |
| 54 | connector |

What is claimed is:

1. A leaf spring spreader assembly comprising;
   a tubular frame (20) having legs (22) extending in opposite directions to spaced ends,
   a screw (32) having threads about a longitudinal axis and having an inner end disposed in telescoping relationship with and extending axially out of said spaced end of each of said legs (22) to a claw end for engaging the end curls (34) of a leaf spring,
   a nut (36) threadedly engaging each of said screws (32) and reacting with said spaced end of each of said legs (22) for moving the associated screw (32) into and out of said leg (22) associated therewith in response to rotation of said nut (36), and
   characterized by a tension spring (52) interconnecting said inner ends of said screws (32) to retain said nuts (36) in engagement with said spaced ends of said legs (22) and to allow said screws (32) to be pulled axially along in and out of said legs (22).

2. An assembly as set forth in claim 1 including threaded holes (38) disposed at each of said inner ends of said screws (32), said tension spring (52) with male threaded ends removable from and interconnecting said threaded holes (38) of said screws (32).

3. An assembly as set forth in claim 1 wherein said tubular frame (20) defines a V-shape with said legs (22) extending along respective axes in opposite directions from an apex (24) to said spaced ends.

4. An assembly as set forth in claim 3 including a cross beam (26) extending across said V-shape and interconnecting said legs (22) for stabilizing said legs (22).

5. An assembly as set forth in claim 4 wherein said cross beam (26) has a right angled cross section with each end thereof cradling one of said legs (22) of said frame.

6. An assembly as set forth in claim 5 including truss members (28) diverging from one another and interconnecting said cross beam (26) and said legs (22).

7. An assembly as set forth in claim 1 wherein each of said nuts (36) includes holes (38) extending radially for receiving a shaft-tool for rotating said nuts (36).

8. An assembly as set forth in claim 1 including a plate (42) secured to each of said claw ends and disposed at an angle relative to said axis of said screw (32) associated therewith and extending above said screw (32) between upper-outer corners (44).

9. An assembly as set forth in claim 8 wherein each of said plates (42) defines a chisel edge (46) between said upper-outer corners (44) to define a guide for engaging the side edges of the end curl (34) of the leaf spring.

10. An assembly as set forth in claim 1 including a collar (30) welded to each of said spaced ends of said legs (22), a bearing (40) disposed about each screw (32) and engaging each of said collars (30) for transmitting thrust loads from and facilitating rotation of said nut (36) associated therewith.

11. An assembly as set forth in claim 1 wherein each of said legs (22) includes a slot (48) extending axially along the screw (32) associated therewith, and including a pin (50) extending radially from one side of a cross hole (38) said screw (32) and into said slot (48) of said leg (22) associated therewith for sliding movement along said slot (48) as said screw (32) moves axially relative to said leg (22).

12. A leaf spring spreader assembly comprising;
a tubular frame (20) having legs (22) extending in opposite directions to spaced ends,
a screw (32) having acme threads about a longitudinal axis and having an inner end disposed in telescoping relationship with and extending axially out of said spaced end of each of said legs (22) to a claw end for engaging the end curl (34) of a leaf spring,
a nut (36) threadedly engaging each of said screws (32) and reacting with said spaced end of each of said legs (22) for moving the associated screw (32) into and out of said leg (22) associated therewith in response to rotation of said nut (36),
a bearing (40) disposed about said screw (32) and engaging each of said spaced ends for transmitting thrust loads from and facilitating rotation of said nut (36) associated therewith,
a plate (42) secured to each of said claw ends and disposed at an angle relative to said axis of said screw (32) associated therewith and extending above said screw (32) associated therewith to an upper-outer corner (44),
each of said legs (22) having a slot (48) extending along its axis,
a pin (50) extending radially from each of said screws (32) and into said slot (48) of said leg (22) associated therewith for sliding movement along said slot (48) as said screw (32) moves axially relative to said leg (22), and characterized by
said tubular frame (20) having a V-shape with said legs (22) extending from an apex (24),
a cross beam (26) extending across said V-shape and interconnecting said legs (22) for stabilizing said legs (22),
said cross beam (26) having right angled cross section with each end thereof cradling one of said legs (22) of said frame,
truss members (28) diverging from one another and interconnecting said cross beam (26) and said legs (22),
a collar 30) welded to each of said spaced ends of said legs (22),
each of said bearings (40) engaging one of said collars (30) for transmitting the thrust loads,
each of said screws (32) having acme threads about said longitudinal axis thereof,
each of said nuts (36) reacting with said collar (30) at said spaced end of each of said legs (22),
each of said nuts (36) having cylindrical holes (38) extending radially for receiving a shaft-tool for rotating said nuts (36),
said angle of said plate (42) relative to said axis being forty degrees,
each of said plates (42) having a chisel edge between said upper-outer corners (44) to define a guide for engaging the side edges of the end curl (34) of the leaf spring,
a threaded hole (38) disposed at each of said inner ends of said screws (32), and a tension spring (54) with male threaded ends interconnecting said threaded holes (38) of said screws (32) to retain said nuts (36) in engagement with said bearings (40) at said spaced ends of said legs (22) and to allow said screws (32) to be moved axially along into and out of said legs (22).

13. A method of fabricating a leaf spring spreader assembly of the type including a tubular frame (20) having legs (22) extending in opposite directions to spaced ends, a screw (32) having threads about a longitudinal axis and having an inner end disposed in telescoping relationship with and extending axially out of the spaced end of each of the legs (22) to a claw end for engaging the end curl (34) of a leaf spring, and a nut (36) threadedly engaging each of the screws (32) and reacting with the spaced end of each of the legs (22) for moving the associated screw (32) into and out of the leg (22) associated therewith in response to rotation of the nut (36), and characterized by the steps of;
connecting the first end of a tension spring (52) to a first screw (32),
attaching the first end of a string to the second end of the tension spring (52),
attaching a weight to the second end of the string,
dropping the weight through the first end of the tubular frame (20) through and beyond the second end of the tubular frame (20),
inserting the first screw (32) into the first end of the tubular frame (20),
pulling and holding the string and second end of the male threaded end and second end of the tension spring (52) beyond the second end of the tubular frame (20),
gripping the second end of the tension spring (52) to hold it beyond the second end of the tubular frame (20),
removing the string from the second end of the tension spring (52),
connecting the second end of the tension spring (52) to the second screw (32),
releasing the gripping and holding of the tension spring (52) out beyond the second end of the tubular frame (20), and
allowing the second screw (32) to insert into the second end of the tubular frame (20) with the inner ends of both screws (32) biased toward the apex (24) of the tubular frame (20) by the tension spring (52).

14. A method as set forth in claim 13 including engaging a nut (36) to a first screw (32) and screwing the nut (36) to the claw end of the first screw (32),
disposing a collar (30) on each of the spaced ends of the legs (22),
sliding a bearing (40) over the screw (32) and into contact with the nut (36),
threadedly connecting the first end of a tension spring (52) to the threaded hole (38) of a first screw (32),
inserting the first screw (32) into the first end of the tubular frame (20) with the bearing (40) in contact with the first end of the tubular frame (20) and the associated collar (30),
engaging a nut (36) to a second screw (32) and screwing the nut (36) to the claw end of the second screw (32),
sliding a bearing (40) over the second screw (32) and into contact with the nut (36), and
threadedly connecting the second end of the tension spring (52) to the threaded hole (38) of the second screw (32).

15. A method as set forth in claim 14 including rotating each screw (32) to an orientation within the tubular frame (20) to align a cross hole (38) in each screw (32) with a slot (48) in each leg (22), and inserting a pin (50) through each slot (48) into aligned cross hole (38) of each screw (32) with the pin (50) extending outside the slot (48) in the associated leg (22) of the tubular frame (20).

16. A method as set forth in claim 13 including bending a pipe into the tubular frame (20) having a V-shape with legs (22) extending in opposite directions from an apex (24) to spaced ends.

17. A method as set forth in claim 16 including the step of welding a cross beam (26) extending across the V-shape and interconnecting the legs (22) for stabilizing the legs (22).

18. A method as set forth in claim 16 including the step of welding each collar (30) to the spaced ends of the legs (22).

19. A method as set forth in claim 16 including the step of welding a plate (42) to a claw end of each of the screws (32) at an angle of forty degrees relative to the axis of the screw (32) associated therewith so as to extend above the screw (32) welded thereto with a chisel edge (46) between upper-outer corners (44).

20. A method of fabricating a leaf spring spreader assembly comprising the steps of;

bending a pipe into a tubular frame (20) having a V-shape with legs (22) extending in opposite directions from an apex (24) to spaced ends, welding a cross beam (26) extending across the V-shape and interconnecting the legs (22) for stabilizing the legs (22), welding truss members (28) to the cross beam (26) and the legs (22) to diverge from one another, welding a collar (30) to each of the spaced ends of the legs (22), producing a slot (48) extending axially along each of said legs (22), threadedly engaging a nut (36) on each of two screws (32) each having acme threads about a longitudinal axis, disposing a bearing (40) about each screw (32) for engaging each of the collars (30), welding a plate (42) to a claw end of each of the screws (32) at an angle of forty degrees relative to the axis of the screw (32) associated therewith so as to extend above the screw (32) welded thereto and having a chisel edge (46) between upper-outer corners (44), attaching the first end of a tension spring (52) to the inner end of a first of the screws (32), attaching an adapter to a first end of a string, attaching the adapter to the second end of spring, attaching a weight to the second end of the string, dropping the weight through the tubular frame (20), inserting the first screw (32) into a first leg (22) of the tubular frame (20) to retain the nut (36) thereon in engagement with the bearings (40) thereon and in engagement with the collar (30) at the end of the first leg (22), pulling the second end of the tension spring (52) out of the second leg (22), gripping the first end of the tension spring (52) to hold the first end of the tension spring (52) out of the second leg (22), removing the adapter and string from the first end of the tension spring (52), attaching the second end of the tension spring (52) to the second screw (32), inserting the second screw (32) into the second leg (22) of the tubular frame (20) to retain the nut (36) thereon in engagement with the bearing (40) thereon in engagement with the collar (30) at the end of the second leg (22) whereby the screws (32) may be pulled axially along into and out of the legs (22) against the biasing of the tension spring (52), and securing a pin (50) into a cross hole (38) in each of the screws (32) to extend radially from and into the slot (48) of the surrounding leg (22) for sliding movement along the slot (48) as the screws (32) move axially relative to the legs (22).

\* \* \* \* \*